US012769867B2

(12) United States Patent
Bouatou et al.

(10) Patent No.: US 12,769,867 B2
(45) Date of Patent: Oct. 20, 2026

(54) METHOD IMPLEMENTED BY A PROCESSING UNIT HAVING ACCESS TO A BIOMETRIC DATABASE

(71) Applicant: IDEMIA IDENTITY & SECURITY FRANCE, Courbevoie (FR)

(72) Inventors: Vincent Bouatou, Courbevoie (FR); Hervé Chabanne, Courbevoie (FR)

(73) Assignee: IDEMIA PUBLIC SECURITY FRANCE, Courbevoie (FR)

( * ) Notice: Subject to any disclaimer, the term of this patent is extended or adjusted under 35 U.S.C. 154(b) by 104 days.

(21) Appl. No.: 18/793,001

(22) Filed: Aug. 2, 2024

(65) Prior Publication Data

US 2025/0045447 A1 Feb. 6, 2025

(30) Foreign Application Priority Data

Aug. 3, 2023 (FR) ....................................... 2308427

(51) Int. Cl.
*G06F 21/62* (2013.01)

(52) U.S. Cl.
CPC ................................ *G06F 21/6227* (2013.01)

(58) Field of Classification Search
CPC ...... G06F 21/32; G06F 21/6245; G06F 21/34; G06F 21/30; G06F 21/31; G06F 21/6218; G06F 21/6209; G06F 21/45; H04L 63/0861; H04L 9/3231; H04L 63/10; H04L 63/0853; H04L 9/0866; H04L 9/0894
See application file for complete search history.

(56) References Cited

U.S. PATENT DOCUMENTS

| | | | | |
|---|---|---|---|---|
| 7,527,192 | B1 * | 5/2009 | Chaskin | H04L 63/10 235/382 |
| 2011/0314285 | A1 | 12/2011 | Hirata et al. | |
| 2013/0081145 | A1 * | 3/2013 | Pitt | G06F 21/32 726/27 |
| 2017/0352209 | A1 | 12/2017 | Keuffer et al. | |
| 2024/0054233 | A1 * | 2/2024 | Ohayon | G06F 21/54 |

FOREIGN PATENT DOCUMENTS

| | | |
|---|---|---|
| CN | 109035519 A | 12/2018 |
| EP | 3 255 614 A1 | 12/2017 |

OTHER PUBLICATIONS

French Preliminary Search Report and Written Opinion issued Feb. 5, 2024 in FR 2308427 filed on Aug. 3, 2023, 8 pages.

* cited by examiner

*Primary Examiner* — Wasika Nipa
*Assistant Examiner* — Edgar W Xie
(74) *Attorney, Agent, or Firm* — Oblon, McClelland, Maier & Neustadt, L.L.P.

(57) ABSTRACT

A method that includes receiving a first biometric datum and a query asking whether the first biometric datum is referenced in a database, searching for a second biometric datum corresponding to the first biometric datum, generating a response to the query, containing a random element satisfying the following conditions: when the second biometric datum is found in the search, the random element is an element from a set of random elements associated with the second biometric datum, when the second biometric datum is not found in the search, the random element does not belong to any of the sets of random elements, and the random element is different from a previous random element contained in a previous response to a previous query asking whether a previous biometric datum is referenced in the database.

10 Claims, 2 Drawing Sheets

[Fig. 1]
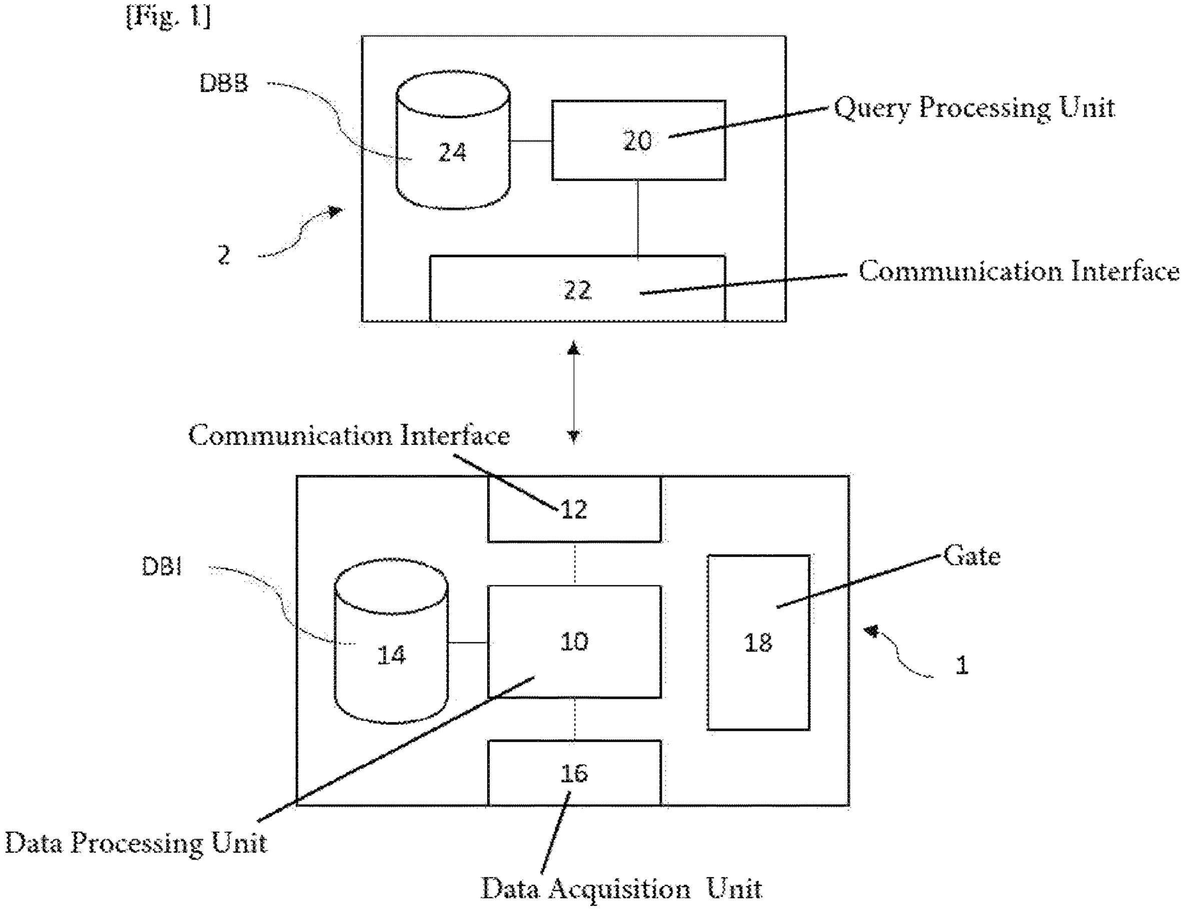

[Fig. 2]
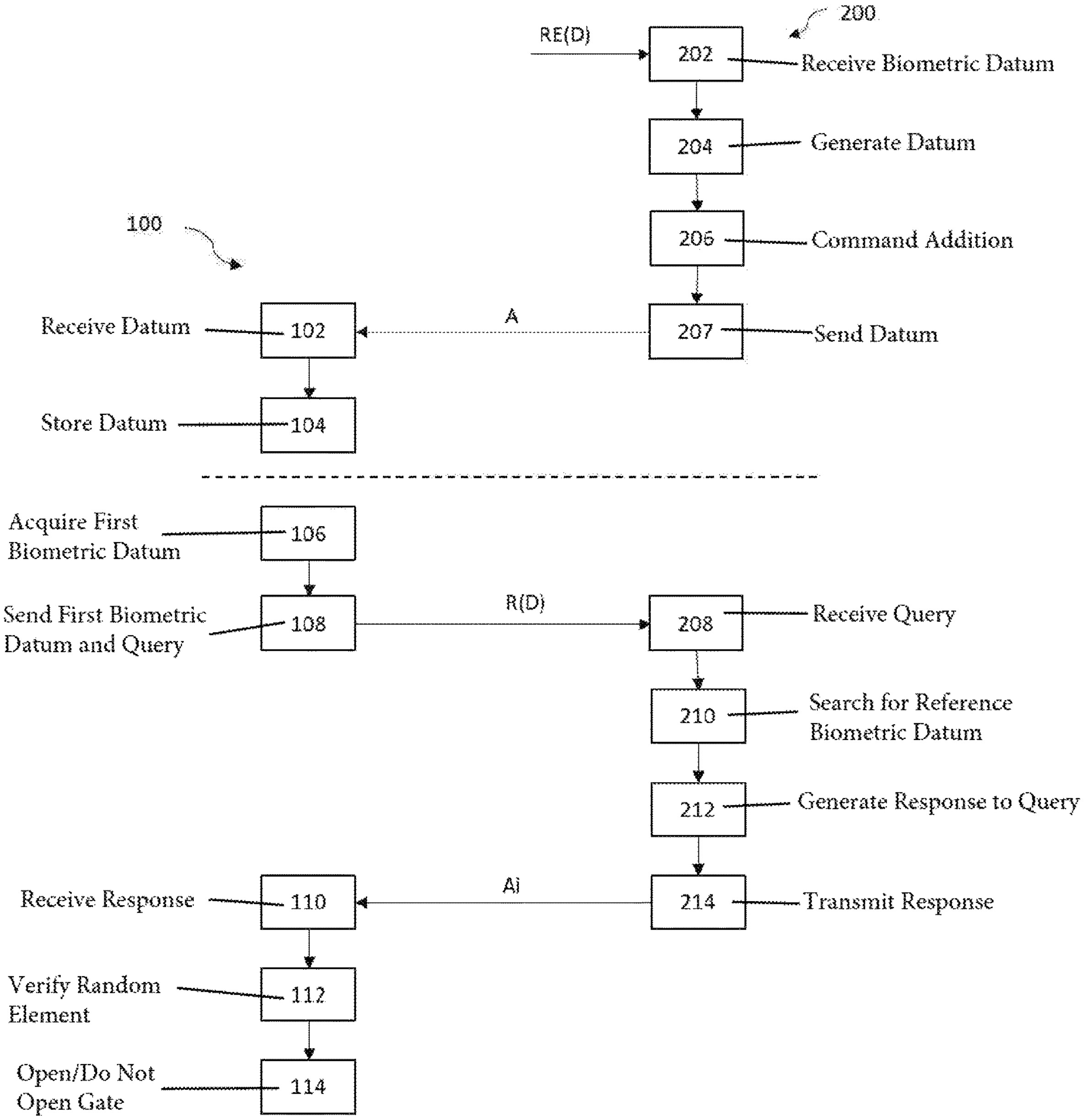

METHOD IMPLEMENTED BY A PROCESSING UNIT HAVING ACCESS TO A BIOMETRIC DATABASE

FIELD OF THE INVENTION

The present invention relates to a method implemented by a processing unit having access to a biometric database.

PRIOR ART

To safeguard the boarding of passengers onto an aircraft, one solution that is contemplated is that of constructing a database containing data of the passengers prior to boarding. Such a database is for example created from biometric data. The identity of the passengers may be checked prior to boarding by interrogating such a database.

Such interrogation generally consists in transmitting a query asking whether a biometric datum is referenced in the database. The query is processed by a processing unit having access to the content of the database. In response to the query, the unit generates a response that indicates whether or not the biometric datum is referenced in the database or not.

However, an attacker could attempt to guess whether or not an individual is a passenger on a flight by submitting a biometric datum of the individual to the processing unit and by generating a query in the format expected by the processing unit. By multiplying queries over a large number of biometric data relating to different individuals, and by analyzing the content of the responses provided by the processing unit, the attacker could even arrive at the conclusion that an individual will board a given flight.

DESCRIPTION OF THE INVENTION

One aim of the invention is to make a biometric database more robust to query attacks, such that it is more difficult for an attacker to determine whether or not an individual is referenced in such a database.

This aim is achieved by way of a method implemented by a processing unit, comprising steps of:

- receiving a first biometric datum and a query asking whether the first biometric datum is referenced in a database, the database comprising reference biometric data associated with respective sets of random elements that are disjoint, each set of random elements comprising a plurality of random elements,
- searching for a second biometric datum that corresponds to the first biometric datum among the reference biometric data,
- generating a response to the query, the response containing a random element satisfying the following conditions:
  - when the second biometric datum is found in the search, the random element is an element from the set of random elements associated with the second biometric datum,
  - when the second biometric datum is not found in the search, the random element does not belong to any of the sets of random elements associated with the reference biometric data,
  - the random element is different from a previous random element contained in a previous response to a previous query asking whether a previous biometric datum is referenced in the biometric database, both when the previous random element is an element from one of the sets of random elements and when the previous random element does not belong to any of the sets of random elements.

The proposed method may also comprise the following optional features, taken alone or in combination whenever technically possible.

Preferably, the method comprises the following steps, implemented for any reference biometric datum, when the reference biometric datum is enrolled in the database:

- generating a datum representative of the set of random elements associated with the reference biometric datum,
- storing the generated datum in the database.

Preferably, for any reference biometric datum, the datum representative of the set of random elements associated with the reference biometric datum consists of the set of random elements associated with the reference biometric datum.

Preferably, the method comprises the following step, carried out for any reference biometric datum following the enrollment of the reference biometric datum:

- commanding the transmission of the datum representative of the set of random elements associated with the reference biometric datum to a checking system.

Preferably, when the second biometric datum is not found in the search, the random element contained in the response is generated by the processing unit after the searching step.

Also proposed is an identity checking method implemented by a checking system communicating with a processing unit configured to implement the abovementioned method, the identity checking method comprising the following steps:

- for any reference biometric datum, receiving a datum representative of the set of random elements associated with the reference biometric datum, following enrollment of the reference biometric datum in the database, and storing the datum representative of the set of random elements associated with the reference biometric datum in a memory,
- transmitting the query asking whether the first biometric datum is referenced in a database to the processing unit,
- receiving the response to the query,
- verifying the existence, in the memory, of a datum representative of a set of random elements that comprises the random element contained in the response.

Preferably: the reference biometric data relate to reference individuals having a right to access a secure area, and the first biometric datum relates to an individual wishing to access the secure area.

Also proposed is a computer program product comprising program code instructions for carrying out the steps of any one of the abovementioned methods when this program is executed by a processing unit.

Also proposed is a computer-readable memory storing instructions able to be executed by the computer in order to carry out the steps of any one of these methods.

Also proposed is a biometric data management system comprising:

- A communication interface configured to:
  - receive a first biometric datum and a query asking whether the biometric datum is referenced in a database, the database comprising reference biometric data associated with respective sets of random elements that are disjoint, each set of random elements comprising a plurality of random elements,
  - send a response to the query,
- a processing unit configured to:

search for a second biometric datum that corresponds to the first biometric datum among the reference biometric data, generate the response to the query, the response containing a random element, wherein the random element satisfies the following conditions:

when the second biometric datum is found in the search, the random element is an element from the set of random elements associated with the second biometric datum, when the second biometric datum is not found in the search, the random element does not belong to any of the sets of random elements associated with the reference biometric data, the random element is different from a previous random element contained in a previous response to a previous query asking whether a previous biometric datum is referenced in the database, both when the previous random element forms part of one of the sets of random elements and when the previous random element does not belong to any of the sets of random elements associated with the reference biometric data.

Also proposed is a system comprising:

A management system in accordance with the above definition, and

A checking device comprising:

A communication interface configured to:

for any reference biometric datum contained in the database, receive a datum representative of the set of random elements associated with the reference biometric datum, following enrollment of the reference biometric datum in the database, send the query to the management system, receive the response to the query, A memory for storing the representative data received by the communication interface, A processing unit configured to verify the existence, in the memory, of a datum representative of a set of random elements that comprises the random element contained in the response.

DESCRIPTION OF THE FIGURES

Further features, aims and advantages of the invention will become apparent from the following description, which is purely illustrative and non-limiting and should be read in conjunction with the appended drawings, in which:

FIG. 1 schematically illustrates a system according to one embodiment of the invention.

FIG. 2 is a flowchart of steps of a method according to one embodiment of the invention.

In all of the figures, similar elements bear identical references.

DETAILED DESCRIPTION OF THE INVENTION

With reference to FIG. 1, a system comprises a checking device 1 and a biometric data management system 2.

The checking device 1 has the role, inter alia, of checking the identity of individuals.

The checking device 1 comprises a data processing unit 10, a communication interface 12 for communicating with the management system 2, and a memory 14.

The data processing unit 10 is configured to implement certain steps of an identity checking method that will be described below. For example, the data processing unit 10 comprises at least one processor configured to execute the code instructions of a program so as to implement these steps.

The communication interface 12 is for example of wireless radio type, and uses any communication protocol (Wi-Fi, Bluetooth, etc.). As a variant, the communication interface is wired (for example Ethernet).

The memory 14 is designed to store data. It is of any type (Flash, EEPROM, hard drive, SSD, etc.).

The memory 14 comprises an identity database DBI. As will be seen below, this identity database is intended to contain information relating to the identity of individuals in association with sets of random elements.

The checking device 1 moreover comprises a biometric data acquisition unit 16. The acquisition unit 16 may comprise a camera configured to acquire images showing the face of an individual, and to extract biometric data from such images. As an alternative, the acquisition unit 16 comprises a fingerprint sensor and/or an iris sensor.

In one embodiment, the checking device 1 furthermore comprises a gate 18 that may be closed in order to prevent an individual from accessing a secure area, and may be opened in order to allow such access. The data processing unit 10 is in particular configured to command the opening and the closure of the gate 18.

For example, the checking device 1 is located in an airport, and the secure area is a boarding area; in this specific application, the individuals wishing to access the boarding area are passengers for a flight, whose identity is to be checked before boarding.

The management system 2 also comprises a query processing unit 20, a communication interface 22 for communicating with the checking device 1, and a memory 24.

The information provided above with regard to the data processing unit 10 and the communication interface 12 may also be applied to the processing unit 20 and to the communication interface 22.

The memory 24 stores a biometric database DBB. The database DBB contains reference biometric data relating to previously enrolled individuals. Preferably, the reference biometric data are not in unencrypted form in the database, but are by contrast confidentiality-protected, that is to say have an encrypted form, by virtue of an encryption method known from the prior art.

No information regarding the identity of the enrolled individuals is stored in the biometric database DBB (surname, first name, date of birth, place of birth, address, etc.), apart from the reference biometric data.

Each reference biometric datum is associated, in the database DBB, with a set of random elements specific to the reference biometric datum. Each set of random elements comprises a plurality of random elements. In the present disclosure, a random element denotes a datum that is generated randomly or depending on a randomly generated datum.

The sets of random elements are all disjoint. Disjoint should be understood to mean that the sets of random elements have no element (random element) in common. In other words, a random element constituting an element of a given set of random elements does not belong to any of the other sets of random elements.

The abovementioned association between reference biometric data and sets of random elements should be taken in the broad sense, and does not necessarily imply that the sets of random elements are stored as such in the biometric database DBB.

Indeed, the database DBB may contain data representative of sets of random elements, and a datum representative of a set of random elements may by all means, but not necessarily, be constituted by the random elements of the set in question. Each reference biometric datum is thus stored, in the database DBB, in association with a datum representative of a set of random elements specific to the biometric datum.

Ultimately, if the database DBB contains N reference biometric data, then it also contains data representative of N sets of random elements respectively associated with the reference biometric data.

The query processing unit 20 is configured to process queries coming from a sender, in particular the checking device 1, these queries aiming to ascertain whether or not a biometric datum is referenced in the biometric database DBB. The processing unit 20 is configured to respond to a query of this type with a response. Preferably, this response is itself confidentiality-protected. In other words, the response is preferably a cipher that it is still necessary to decrypt in order to ascertain whether the biometric datum provided with the initial query was actually referenced in the biometric database.

With reference to FIG. 2, a method using the system described above comprises two phases: an enrollment phase and a checking phase.

By convention, the steps implemented by the checking device 1 are collectively called method 100, and the steps implemented by the management system are collectively called method 200.

During the enrollment phase, individuals acquire a right.

Hereinafter, a detailed description will be given of an application in which this right is a right to access the secure area described above. Consideration is therefore given to the application in which the checking device 1 has the role of making physical access to the secure area for individuals conditional. For illustrative purposes, it will be assumed that this secure area is a boarding area in an airport, and that the user wishes to acquire a ticket for a flight.

It will initially be assumed that the biometric database DBB is empty.

A user provides the checking device 1 with information regarding their identity (surname, first name, etc.), and provides the management device 2 with a biometric datum D relating to this user during the enrollment phase. For example, the user transmits these data via a terminal that they possess, for example a smartphone, a tablet or a personal computer. The biometric datum D is for example acquired by a sensor of the terminal of the user.

In a step 202, the management device 2 receives the biometric datum D relating to the individual, and an enrollment query RE in relation to the biometric datum D. This enrollment query RE may or may not be relayed by the checking device 1.

The query processing unit 20 processes the enrollment query RE as follows.

In a step 204, the processing unit 20 generates a datum A representative of a set of random elements. The set of random elements comprises a plurality of random elements of different values {A1, . . . , Ai, . . . , AM}.

In a first embodiment of step 204, the datum A representative of the set of random elements may be the set of random elements itself, that is to say the M random elements A1, . . . , Ai, . . . , AM directly.

In a second embodiment of step 204, the datum A representative of the set of random elements comprises at least one datum based on which the set of random elements is able to be reconstituted by a reconstruction processing operation known to the processing unit 20.

In a step 206, the processing unit 20 commands the addition, to the biometric database DBB, of the biometric datum D received in association with the datum A representative of the set of random elements {A1, . . . , Ai, . . . , AM} generated in step 204. The received biometric datum D then becomes an enrolled reference biometric datum.

In a step 207, the management system 2 sends, to the checking device 1, the datum A representative of the set of random elements associated with the biometric datum D, in response to the enrollment query in relation to the biometric datum D.

Thus, in the first embodiment, the management system transmits, as datum A, the set formed by the M random elements A1, . . . , Ai, . . . , AM generated for the biometric datum D.

In the second embodiment, the M random elements are not sent to the checking device 1, but the checking device 1 is capable of reconstituting, if necessary, the set of random elements {A1, . . . , Ai, . . . , AM} using the same reconstruction processing operation as that used by the management system 2. The second embodiment has the advantage of requiring fewer storage resources and less bandwidth than the first embodiment. Indeed, the volume of the datum representative of the set of random elements is smaller.

In a step 102, the checking device 1 receives the datum A.

In a step 104, the checking device 1 stores, in the identity database DBI, the datum A representative of the set of random elements, in association with information relating to the identity of the individual to whom the biometric datum D relates, which the individual has provided beforehand (surname, first name, address, etc.).

The above steps are repeated for each new user wishing to be enrolled.

Upon each new implementation of the generation step 204, a new datum A representative of a new set of random elements is generated. Any new set of random elements satisfies the disjunction constraints discussed above, that is to say that all of the random elements that said set contains do not appear in any set of random elements represented by a previously generated datum A in a previous implementation of step 204.

At the end of the enrollment phase, N individuals have been enrolled. Consequently, N reference biometric data relating respectively to these individuals are present in the biometric database DBB, in association with N data A representative of N sets of random elements that are all disjoint. Moreover, the N data A representative of N sets of random elements are also stored in the other database DBI in association with information relating to the identity of the individuals.

During a checking phase subsequent to the enrollment phase, individuals lay claim to the abovementioned right.

For this purpose, one of these individuals moves to the vicinity of the checking device 1.

In a step 106, the checking device 1 acquires a biometric datum D in relation to the individual, which will by convention be called "first biometric datum". This step may be carried out using the biometric acquisition unit of the checking device 1. As a variant, if the reference individual possesses a terminal, this terminal may acquire the first biometric datum D and then transmit it to the checking device 1.

In a step 108, the device sends, to the management system 2, the first biometric datum D and a query R asking whether the first biometric datum D is referenced in the biometric database DBB.

The query processing unit 20 receives the query R in a step 208, and applies the following processing operation to this query R.

In a step 210, the query processing unit 20 searches, in the biometric database DBB, for a reference biometric datum that corresponds to the first biometric datum targeted by the query R. By convention, a reference biometric datum D' that corresponds to the first biometric datum will be called "second biometric datum".

Step 210 is known from the prior art. This step 210 may comprise computing a metric representative of a distance between the biometric datum D and a reference biometric datum, and comparing this distance with a predefined threshold. If the distance is less than the threshold, then it is considered that the compared two biometric data match. In the opposite case, it is considered that the two biometric data do not match, and the computing and comparison steps are repeated for another reference biometric datum contained in the biometric database DBB.

The search 210 yields two possible results: either the second biometric datum D' is found or the second biometric datum D' is not found (that is to say no reference biometric datum contained in the biometric database DBB corresponds to the first biometric datum D).

In a step 212, the processing unit 20 generates a response to the query, the response comprising a random element. This step 212 is carried out regardless of the result of the search 210.

The random element contained in the response generated in step 212 satisfies the following conditions:

a) When the second biometric datum D' is found in the search, the random element is an element from the set of random elements associated with the second biometric datum.

b) When the second biometric datum D' is not found in the search, the random element does not belong to any of the sets of random elements.

c) The random element is different from a previous random element contained in a previous response to a previous query asking whether a previous biometric datum is referenced in the reference biometric database, both when the previous random element is an element from one of the sets of random elements and when the previous random element does not belong to any of the sets of random elements.

In case a), the processing unit 20 simply selects one of the random elements from the set represented by the datum A associated with the datum D', this datum A having been generated in the enrollment phase.

Preferably, in case b), the random element is generated by the processing unit 20 following the searching step 210.

Regardless of the result of the search 210 (case a) or case b)), the random element contained in the response is always coded on the same number of bits, preferably at least 16 bits, or even at least 32 bits. As indicated above, it is easy to obtain a random element that satisfies the condition of non-membership stated in case b) when this random element is coded on a high number of bits.

In a step 214, the management system 2 transmits the response to the sender of the query, otherwise to the checking device 1.

In a step 110, the checking device 1 receives the response containing the random element.

In a step 112, the checking device 1 verifies whether the random element contained in the response is referenced in the database DBI, that is to say whether the random element contained in the response forms part of one of the N sets of random elements that are represented by the data A stored in the database DBI.

In the first embodiment discussed above, the processing unit 10 simply compares the random element received in the response with a random element stored in the memory 14, and repeats this step until a random element stored in the database DBI is found that is equal to the random element contained in the response or until all of the sets of random elements have been run through.

In the second embodiment, the processing unit 10 applies the reconstruction processing operation in order to reconstitute a set of random elements, before comparing the received random element with the random elements of the reconstituted set. These steps are repeated until a random element stored in the database DBI is found that is equal to a reconstituted random element or until all of the sets of random elements have been reconstituted and run through.

If, during the verification 112, the checking device 1 finds that the random element received in the response is referenced in the identity database DBI, then it is considered that the individual to whom the first biometric datum D relates does indeed have the right that they wish to exercise (in this case, to access the secure area). The processing unit 10 then automatically commands the opening of the gate 18 so as to allow the individual to access the secure area.

If, during the verification 112, the checking device 1 finds, on the other hand, that the received random element is not referenced in the identity database DBI, then it is presumed that the individual to whom the first biometric datum relates does not have the right that they wish to exercise (in this case, to access the secure area). The processing unit 10 then does not automatically command the opening of the gate 18, thus preventing the individual from accessing the secure area. In this second case, a manual check on the identity of the individual may optionally be carried out as a supplementary measure, asking the user to provide an identity document (identity card, passport or the like), and it may be verified whether the database contains identity information corresponding to the information recorded in the identity document (last name, first name, etc.).

The above steps are repeated each time a new individual lays claim to the abovementioned right.

An Attacker Attempting to Access the Database

It will now be assumed that an attacker is seeking to obtain information regarding the content of the biometric database DBB, by interrogating the management system 2 with successive queries, and by analyzing the corresponding responses returned by the management system 2. It will be assumed that the attacker has succeeded in obtaining biometric data relating to individuals, and knows the format of the queries that the processing unit 20 is intended to process.

Using a terminal, the attacker sends, to the management system 2, a biometric datum and a query asking whether the biometric datum is referenced in the database, in the format expected by the management system 2, and repeats this step multiple times, like in step 108 implemented by the checking device 1.

The management system 2 processes each query in accordance with steps 210, 212, 214 described above. The attacker, sending the queries, therefore receives a succession of responses.

This succession of responses does not provide the attacker with any useful information.

First of all, each response that the attacker receives contains a random element, both in the case where the biometric datum tested by the attacker is actually present in the database DBB (condition a) and in the opposite case (condition b).

Second of all, all of the responses that the attacker successively receives contain, by design, different random elements (condition c). Indeed, upon each new query, the processing unit "draws", from a set of random elements, a value of a random element that has not already been used beforehand and returned in response to a previous query. It should be noted that the random element may be drawn from a set of random elements that has been associated with a reference biometric datum (if, by chance, the attacker has managed to get their hands on a biometric datum relating to an individual enrolled in the biometric database DBB) or not (when the biometric datum submitted by the attacker relates to an individual who is not referenced in the biometric database DBI). From the attacker's point of view, the behavior of the management system is similar in both cases.

This principle in no way prevents the checking device 1 from subsequently carrying out the identity checking phase discussed above (steps 110, 112, 114). If it happens that the management system 2 has responded to queries from an attacker between the enrollment phase and the checking phase, the management system 2 will nevertheless provide the checking device 1 with a random element satisfying conditions a), b), c), the only difference potentially lying in the value of the returned random element.

For example, the checking device 1 will receive the random element A1 associated with an enrolled individual as response in step 110, if no intermediate attack has been carried out. On the other hand, if two intermediate attacks are carried out with two biometric data that turn out to relate to an enrolled individual, the attacker will receive the random elements A1, A2 as responses, and the checking device 1 will receive, in step 110, the random element A3 as response to a query based on a biometric datum of the same individual. Of course, this example assumes that the index i associated with a biometric datum increments, but the interval of integers of length M may be run through by other logic (in particular by decrementation).

One situation that may occur is that in which the processing unit 20 is interrogated a number of times that is so high (for example by an attacker) that the set of random elements {A1, . . . , Ai, . . . , AM} associated with one of the reference biometric data is completely "consumed". In this case, two policies may be implemented.

According to a first policy, the processing unit 20 implements steps 204, 206, 207 again so as to transmit, to the checking device 1, a new datum A' associated with the biometric datum in question (the checking device 1 also repeats steps 102, 104).

According to a second policy, the processing unit 20 returns a new random element not belonging to any of the sets of random elements (as in case b) but, unlike the first policy, the processing unit 20 does not "declare" this new random element to the checking device 1 via step 207. In this case, the enrolled individual to whom the reference biometric datum under discussion relates will not be recognized as being enrolled in step 112. It is advantageous to carry out a manual check on the identity of the individual as a supplementary measure in order to cover such a situation, as indicated above.

The invention claimed is:

1. A method implemented by processing circuitry, the method comprising:

receiving a first biometric datum and a query asking whether the first biometric datum is referenced in a database, the database comprising reference biometric data associated with respective sets of random elements that are disjoint, each set of random elements comprising a plurality of random elements;

searching for a second biometric datum that corresponds to the first biometric datum among the reference biometric data; and generating a response to the query, the response containing a random element satisfying the following conditions:

when the second biometric datum is found in the search, the random element is an element from the set of random elements associated with the second biometric datum, when the second biometric datum is not found in the search, the random element does not belong to any of the sets of random elements associated with the reference biometric data, and the random element is different from a previous random element contained in a previous response to a previous query asking whether a previous biometric datum is referenced in the database, both when the previous random element is an element from one of the sets of random elements and when the previous random element does not belong to any of the sets of random elements, wherein when the second biometric datum is not found in the search, the random element contained in the response is generated by the processing circuitry after the searching.

2. The method as claimed in claim 1, further comprising, implemented for any reference biometric datum, when the reference biometric datum is enrolled in the database:

generating a datum representative of the set of random elements associated with the reference biometric datum, and storing the generated datum in the database.

3. The method as claimed in claim 2, wherein, for any reference biometric datum, the datum representative of the set of random elements associated with the reference biometric datum consists of the set of random elements associated with the reference biometric datum.

4. The method as claimed in claim 2, further comprising, carried out for any reference biometric datum following the enrollment of the reference biometric datum:

commanding transmission of the datum representative of the set of random elements associated with the reference biometric datum to a checking system.

5. An identity checking method implemented by a checking system communicating with processing circuitry configured to implement a method that includes receiving a first biometric datum and a query asking whether the first biometric datum is referenced in a database, the database comprising reference biometric data associated with respective sets of random elements that are disjoint, each set of random elements comprising a plurality of random elements, searching for a second biometric datum that corresponds to the first biometric datum among the reference biometric data, and generating a response to the query, the response containing a random element satisfying the following conditions:

when the second biometric datum is found in the search, the random element is an element from the set of random elements associated with the second biometric datum, when the second biometric datum is not found in the search, the random element does not belong to any of the sets of random elements associated with the reference biometric data, and the random element is different from a previous random element contained in a previous response to a previous query asking whether a previous biometric datum is referenced in the database, both when the previous random element is an element from one of the sets of random elements and when the previous random element does not belong to any of the sets of random elements, the identity checking method comprising:

for any reference biometric datum, receiving a datum representative of the set of random elements associated with the reference biometric datum, following enrollment of the reference biometric datum in the database, and storing the datum representative of the set of random elements associated with the reference biometric datum in a memory;

transmitting the query asking whether the first biometric datum is referenced in a database to the processing circuitry;

receiving the response to the query; and verifying existence, in the memory, of a datum representative of a set of random elements that comprises the random element contained in the response.

6. The identity checking method as claimed in claim 5, wherein:

the reference biometric data relate to reference individuals having a right to access a secure area, and the first biometric datum relates to an individual wishing to access the secure area.

7. A non-transitory computer-readable storage medium including computer executable instructions, wherein the instructions, when executed by a computer, cause the computer to perform the method as claimed in claim 1.

8. A non-transitory computer-readable storage medium including computer executable instructions, wherein the instructions, when executed by a computer, cause the computer to perform the identity checking method as claimed in claim 6.

9. A biometric data management system comprising:

a communication interface configured to:

receive a first biometric datum and a query asking whether the first biometric datum is referenced in a database, the database comprising reference biometric data associated with respective sets of random elements that are disjoint, each set of random elements comprising a plurality of random elements, and send a response to the query; and processing circuitry configured to:

search for a second biometric datum that corresponds to the first biometric datum among the reference biometric data, and generate the response to the query, the response containing a random element, wherein the random element satisfies the following conditions:

when the second biometric datum is found in the search, the random element is an element from the set of random elements associated with the second biometric datum, when the second biometric datum is not found in the search, the random element does not belong to any of the sets of random elements associated with the reference biometric data, and the random element is different from a previous random element contained in a previous response to a previous query asking whether a previous biometric datum is referenced in the database, both when the previous random element forms part of one of the sets of random elements and when the previous random element does not belong to any of the sets of random elements associated with the reference biometric data, wherein when the second biometric datum is not found in the search, the random element contained in the response is generated by the processing circuitry after the searching.

10. A system comprising:

the management system as claimed in claim 9; and a checking device comprising:

a communication interface configured to:

for any reference biometric datum contained in the database, receive a datum representative of the set of random elements associated with the reference biometric datum, following enrollment of the reference biometric datum in the database, send the query to the management system, and receive the response to the query, a memory configured to store the datum received by the communication interface, and checking device processing circuitry configured to verify existence, in the memory, of a datum representative of a set of random elements that comprises the random element contained in the response.

* * * * *